United States Patent [19]
Althaus et al.

[11] Patent Number: 6,092,935
[45] Date of Patent: Jul. 25, 2000

[54] OPTOELECTRONIC TRANSMITTING AND/OR RECEIVING MODULE AND METHOD FOR ITS PRODUCTION

[75] Inventors: Hans-Ludwig Althaus, Lappersdorf; Werner Späth, Holzkirchen, both of Germany

[73] Assignee: Siemens Aktiengesellschaft, Munich, Germany

[21] Appl. No.: 09/261,101

[22] Filed: Mar. 2, 1999

Related U.S. Application Data

[63] Continuation of application No. PCT/DE97/01811, Aug. 22, 1997.

[51] Int. Cl.[7] .................................................. G02B 6/42
[52] U.S. Cl. ........................................ 385/93; 385/92
[58] Field of Search ................................. 385/88–94

[56] References Cited

U.S. PATENT DOCUMENTS

| | | | |
|---|---|---|---|
| 4,650,285 | 3/1987 | Stevenson | 250/227.11 |
| 4,995,687 | 2/1991 | Nagai et al. | 385/91 |
| 5,107,537 | 4/1992 | Schriks et al. | 385/91 |
| 5,347,604 | 9/1994 | Go et al. | 385/92 |
| 5,537,503 | 7/1996 | Tojo et al. | 385/93 |
| 5,586,207 | 12/1996 | Goodwin | 385/92 |
| 5,586,208 | 12/1996 | Nishiyama | 385/93 |
| 5,604,361 | 2/1997 | Isaksson | 385/90 X |
| 5,987,205 | 11/1999 | Moseley et al. | 385/92 X |

FOREIGN PATENT DOCUMENTS

| | | |
|---|---|---|
| 0573941A1 | 12/1993 | European Pat. Off. . |
| 0664585A1 | 7/1995 | European Pat. Off. . |
| 4022076A1 | 1/1992 | Germany . |
| 63-182616 | 7/1988 | Japan ........................... 385/91 |
| 4-37705 | 2/1992 | Japan ........................... 385/90 |
| 1485181 | 6/1989 | U.S.S.R. ........................ 385/90 |

OTHER PUBLICATIONS

Japanese Patent Abstract No. 57118212 (Yoshisada), dated Jul. 23, 1982.
Japanese Patent Abstract No. 59010289 (Tsunetoshi), dated Jan. 19, 1984.
Japanese Patent Abstract No. 59166907 (Yoshiaki), dated Sep. 20, 1984.
Japanese Patent Abstract No. 59166906 (Masatoshi), dated Sep. 20, 1984.

*Primary Examiner*—John D. Lee
*Attorney, Agent, or Firm*—Herbert L. Lerner; Laurence A. Greenberg; Werner H. Stemer

[57] ABSTRACT

An optoelectronic transmitting and/or receiving module for signal transmission through the use of an optical waveguide, includes an optoelectronic transmitting and receiving unit disposed in a housing having a support plate, a covering cap and a window. The covering cap has an optical waveguide connection device which is constructed in such a way that the optical waveguide connection device can be adjusted with respect to the optoelectronic unit prior to final fixing. A method for producing the optoelectronic transmitting and/or receiving module is also provided.

7 Claims, 4 Drawing Sheets

OPTOELECTRONIC TRANSMITTING AND/OR RECEIVING MODULE AND METHOD FOR ITS PRODUCTION

CROSS-REFERENCE TO RELATED APPLICATION

This application is a continuation of copending International Application No. PCT/DE97/01811, filed Aug. 22, 1997, which designated the United States.

BACKGROUND OF THE INVENTION

Field of the Invention

The invention relates to an optoelectronic transmitting and/or receiving module for signal transmission through the use of an optical waveguide, including a housing formed essentially by a support plate and a covering cap, an optoelectronic transmitting and/or receiving unit disposed in the housing, associated with the support plate and having an optoelectronic transmitting element and/or an optoelectronic receiving element and an optical radiation focusing device adjusted relative thereto, in particular for maximum radiation output and/or input coupling into and/or out of the optoelectronic transmitting and/or receiving unit, an electrically conductive bushing passing through the housing for at least one electrical connection of the optoelectronic transmitting and/or receiving unit, and an optical waveguide connection device of the covering cap. The invention also relates to a method for producing an optoelectronic transmitting and/or receiving module. Such a module is disclosed in European Patent Application EP 0 664 585 A1, for example. A transmitting and receiving module for bidirectional optical message and signal transmission is described in that patent application. In the case of that known module, on the fundamental structural concept of which the inventive optoelectronic transmitting and/or receiving module disclosed in the instant application is based, a hybrid laser module chip and a PIN diode chip are disposed on a baseplate with a plurality of electrical housing bushings. A covering cap is fixed on the baseplate, has a window and, together with the baseplate, forms the housing of the transmitting and receiving module. The window serves for the output and/or input coupling of radiation emitted and/or received by the transmitting and receiving module out of and/or into the interior of the housing. The housing is constructed to be hermetically sealed and is provided with a vacuum or filled with gas.

German Published, Non-Prosecuted Patent Application DE 40 22 076 A1 discloses an apparatus for the transmission of light between an optoelectronic component and an optical waveguide with a spherical lens for focusing the light radiation, in which the optoelectronic component is fixed on a baseplate of a gas-tight housing. A sleeve with a radiation passage opening in which the spherical lens is fitted is emplaced on the baseplate. The optical waveguide is pushed into the sleeve on that side of the sleeve which is remote from the baseplate. In order to adjust the spherical lens with respect to the optoelectronic component, the latter is activated, the sleeve is moved with respect to the baseplate until the light intensity coupled over between the component and the optical waveguide becomes maximal, and the sleeve is subsequently fixed on the baseplate. In that apparatus it is not possible for the optical waveguide to be adjusted separately with respect to the spherical lens and the component. The sleeve and the spherical lens must therefore be constructed as high-precision parts.

U.S. Pat. No. 4,650,285 describes an optoelectronic structural unit in which an optoelectronic transmitting element is disposed on a support plate, with a spherical lens being situated above the transmitting element. A covering cap with a radiation passage window is fixed on the support plate, in such a way that the support plate, together with the covering cap, completely encloses the optoelectronic transmitting element. In order to mount and adjust the optoelectronic structural unit, the covering cap is held above the support plate through the use of a chuck, which has an optical fiber disposed centrally above the radiation passage window, for communicating with the electrically activated optoelectronic transmitting element. The covering cap is then moved relative to the support plate until a maximum output power of the electrically activated optoelectronic transmitting element is detected in the optical fiber. The covering cap is fixed on the support plate in that position. In order to connect an optical waveguide to the optoelectronic structural unit, a fitting part is placed onto the covering cap, with the end of the optical waveguide being inserted into the fitting part. In order to ensure accurate adjustment of the optical waveguide with respect to the optoelectronic transmitting element, both the covering cap and the fitting part must be constructed as high-precision parts. Large tolerances during the manufacture of those parts would lead to a low yield in the production of the optoelectronic structural units. In the case of that optoelectronic structural unit, it is only possible to compensate for an inaccuracy in the positioning of the optoelectronic transmitting element by subsequent adjustment of the covering cap. Separate adjustment of the fitting part and thus of the optical waveguide is not possible in that case.

SUMMARY OF THE INVENTION

It is accordingly an object of the invention to provide an optoelectronic transmitting and/or receiving module and a method for its production, which overcome the hereinaforementioned disadvantages of the heretofore-known devices and methods of this general type, which ensure simple and improved adjustment of an optical waveguide with respect to an optoelectronic transmitting and/or receiving unit, which reduce the mounting outlay for the optical waveguide and which provide a module having minimal dimensions.

With the foregoing and other objects in view there is provided, in accordance with the invention, an optoelectronic transmitting and receiving module for signal transmission with an optical waveguide, comprising a housing formed substantially of a support plate and a covering cap; an optoelectronic transmitting and receiving unit disposed in the housing and associated with the support plate, the optoelectronic transmitting and receiving unit having an optoelectronic transmitting element, an optoelectronic receiving element and an optical radiation focusing device adjusted relative to the optoelectronic transmitting and receiving elements; and an electrically conductive bushing passing through the housing for at least one electrical connection of the optoelectronic transmitting and receiving unit; the covering cap having a wall sleeve and a connection part with an optical waveguide connection device, the connection part displaceable on the wall sleeve for adjusting the optical waveguide connection device relative to the optoelectronic transmitting and receiving unit substantially immediately before finally fixing the connection part on the wall sleeve for connecting the optical waveguide connection device to the wall sleeve; and the support plate having a hermetically sealed window cap with a radiation passage opening, the window cap enclosed by the wall sleeve and disposed below the optical waveguide connection device.

The support plate has an inner region and a covering cap mounting region enclosing the inner region. The optoelectronic transmitting and/or receiving unit is disposed on the inner region, preferably in such a way that the radiating direction and/or receiving direction of the optoelectronic transmitting and/or receiving unit runs essentially perpendicularly to the support plate and away from the latter. The covering cap has a side wall which encloses the inner region and an end area facing the support plate that bears on the support plate in the covering cap mounting region and is fixedly connected to the support plate. The area of the inner region is smaller in all of its dimensions than the area enclosed by the side wall on the support plate. As a result, essentially immediately before the covering cap is finally fixedly connected to the support plate, in order to adjust the optical waveguide connection device with respect to the optoelectronic unit, in particular for maximum radiation input and/or output coupling into and/or out of the optical waveguide, the covering cap can be displaced preferably in all directions with respect to the optoelectronic transmitting and/or receiving unit.

This optoelectronic transmitting and/or receiving module according to the invention can advantageously be realized with a minimal requirement in terms of individual parts and with extremely small dimensions, since separate adjusting apparatuses for the optical waveguide or for the optoelectronic transmitting and/or receiving module are not necessary.

The covering cap with the optical waveguide connection is composed of a first part and a second part. The first part has a housing cap with a mounting area on which the second part is fixed. The second part has the optical waveguide connection device. This embodiment has the advantage, in particular, that initially the first part with the housing cap can be fixed on the support plate and then the second part with the optical waveguide connection device can be adjusted with respect to the optoelectronic transmitting and/or receiving unit and fixed.

In accordance with another feature of the invention, the covering cap with the optical waveguide connection device is fixed directly on the support plate, or that is to say the first part is fixed directly on the support plate and the second part is fixed on the first part, in a non-releasable manner through the use of adhesive bonding, soldering or welding.

In accordance with a further feature of the invention, the thickness of the covering cap mounting region is less than the thickness of the inner region and that end area of the side wall which faces the support plate is connected to the support plate in the covering cap mounting region. The smaller thickness of the covering cap mounting region as compared to the inner region affords the advantage, in particular, that the covering cap mounting region of the support plate can be locally heated very rapidly and precisely through the use of a laser, by way of example, without the inner region in which the optoelectronic transmitting and/or receiving unit is disposed being excessively heated at the same time. As a result of this, the optoelectronic transmitting and/or receiving unit can advantageously be protected against excessively high heat loads.

In the optoelectronic transmitting and/or receiving module according to the invention, the covering cap has a hermetically sealed window cap with the window. The window cap is disposed on the support plate, and a wall sleeve encloses the window cap. The inner cross section of the wall sleeve is larger than the outer cross section of the window cap, with the result that the wall sleeve, before being fixed on the support plate or on the window cap, can be displaced with respect thereto. The optical waveguide connection device is fixed on an end area of the wall sleeve, the end area being remote from the support plate, and is disposed above the window cap. In an advantageous manner, this embodiment also requires only an extremely low mounting outlay and has a very small structural size.

In accordance with an added feature of the invention, there is provided a transparent disk disposed in the radiation passage opening, the disk constructed as an optical filter for attenuating specific wavelengths or intensities or allowing them to pass, depending on requirements.

In accordance with an additional feature of the invention, the optical waveguide connection device has a receptacle for the plug-in fastening of an optical waveguide provided with a connector. This has the particular advantage, for example, that a defective optoelectronic transmitting and/or receiving module can be exchanged in a simple manner.

With the objects of the invention in view there is also provided a method for producing an optoelectronic transmitting and receiving module for signal transmission with an optical waveguide, which comprises producing an optoelectronic transmitting and receiving unit with an optoelectronic transmitting element, an optoelectronic receiving element and an optical radiation focusing device adjusted relative to at least one of the elements; fixing the optoelectronic transmitting and receiving unit on a support plate; fixing a window cap with a radiation passage opening, on the support plate; fixing a wall sleeve enclosing and projecting above the window cap, on one of the support plate and the window cap; placing a connection part with an optical waveguide connection device on the wall sleeve above the radiation passage opening of the window cap; starting up the optoelectronic transmitting and receiving unit; adjusting the connection part with the optical waveguide connection device relative to the optoelectronic transmitting and receiving unit by displacing the connection part and the support plate relative to one another; and fixing the connection part relative to the support plate.

In the method for producing an optoelectronic transmitting and/or receiving module according to the invention, in which the covering cap has a hermetically sealed window cap with a window and a wall sleeve enclosing the window cap and projecting above it, and in which a connection part with an optical waveguide connection device is disposed on the wall sleeve above the window cap, first of all the window cap is fixed on the support plate, in such a way that the support plate, together with the window cap, forms e.g. a hermetically sealed housing. Afterwards, the wall sleeve is placed onto the window cap or the support plate and fixed before the connection part with the optical waveguide connection device is adjusted by the connection part being displaced with respect to the support plate, e.g. for maximum radiation input coupling into the optical waveguide or into the receiving element, and is fixed on the wall sleeve.

Other features which are considered as characteristic for the invention are set forth in the appended claims.

Although the invention is illustrated and described herein as embodied in an optoelectronic transmitting and/or receiving module and a method for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
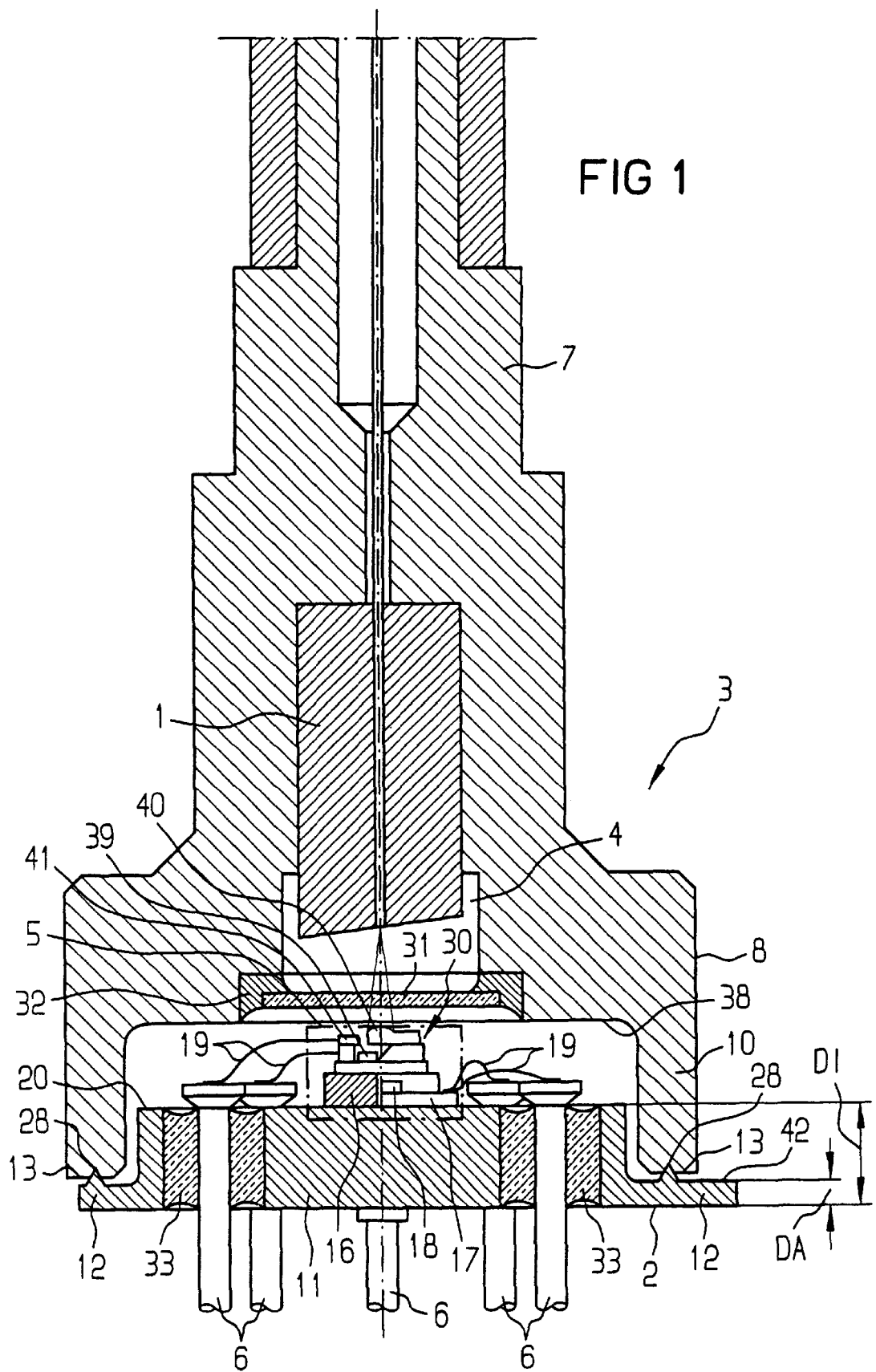
FIG. 1 is a diagrammatic, sectional view of an optoelectronic transmitting and/or receiving module.

Referring now in detail to the figures of the drawings, in which identical component parts are provided with the same reference symbols, and first, particularly, to FIG. 1 thereof, there is seen an optoelectronic transmitting and/or receiving module in which an optoelectronic transmitting and/or receiving unit 5 is disposed on a support plate 2, for example a conventional standard 8-pin TO39 baseplate. The transmitting and/or receiving unit contains a U-shaped heat sink 16 which is produced, for example, from copper, ceramic or silicon, an insulator support element 17 on which a PIN diode chip 18 or another photodiode is fixed, and a hybrid laser module chip 30 with a laser diode 39 disposed on a submount, two deflection prisms, a monitor diode 41 and an optical converging configuration 40. A more detailed description of the hybrid laser module chip 30 is contained, for example, in European Patent Application EP 0 664 585 A1 and therefore is not described in any more detail herein.

The hybrid laser module chip 30 is disposed on the U-shaped heat sink 16 in such a way that it is situated above the PIN diode chip 18 positioned within the U-shaped heat sink 16. The positioning of the hybrid laser module chip 30 and the PIN diode chip 18 with respect to one another is also described in European Patent Application EP 0 664 585 A1 and therefore is not explained in any more detail at this point.

Electrical housing bushings 6 are disposed in the support plate 2 and lead through the support plate 2. Electrical connections of the optoelectronic transmitting and/or receiving unit 5 are connected to the housing bushings 6 through the use of bonding wires 19, for example, and are routed out of the interior of a housing formed by a covering cap 3 and the baseplate 2. The housing bushings 6 are fixed in the support plate 2 through the use of an electrically insulating bonding agent 33, for example an adhesive or a glass solder, or are glass-encapsulated in a hermetically sealed manner as is standard.

Figure 2:
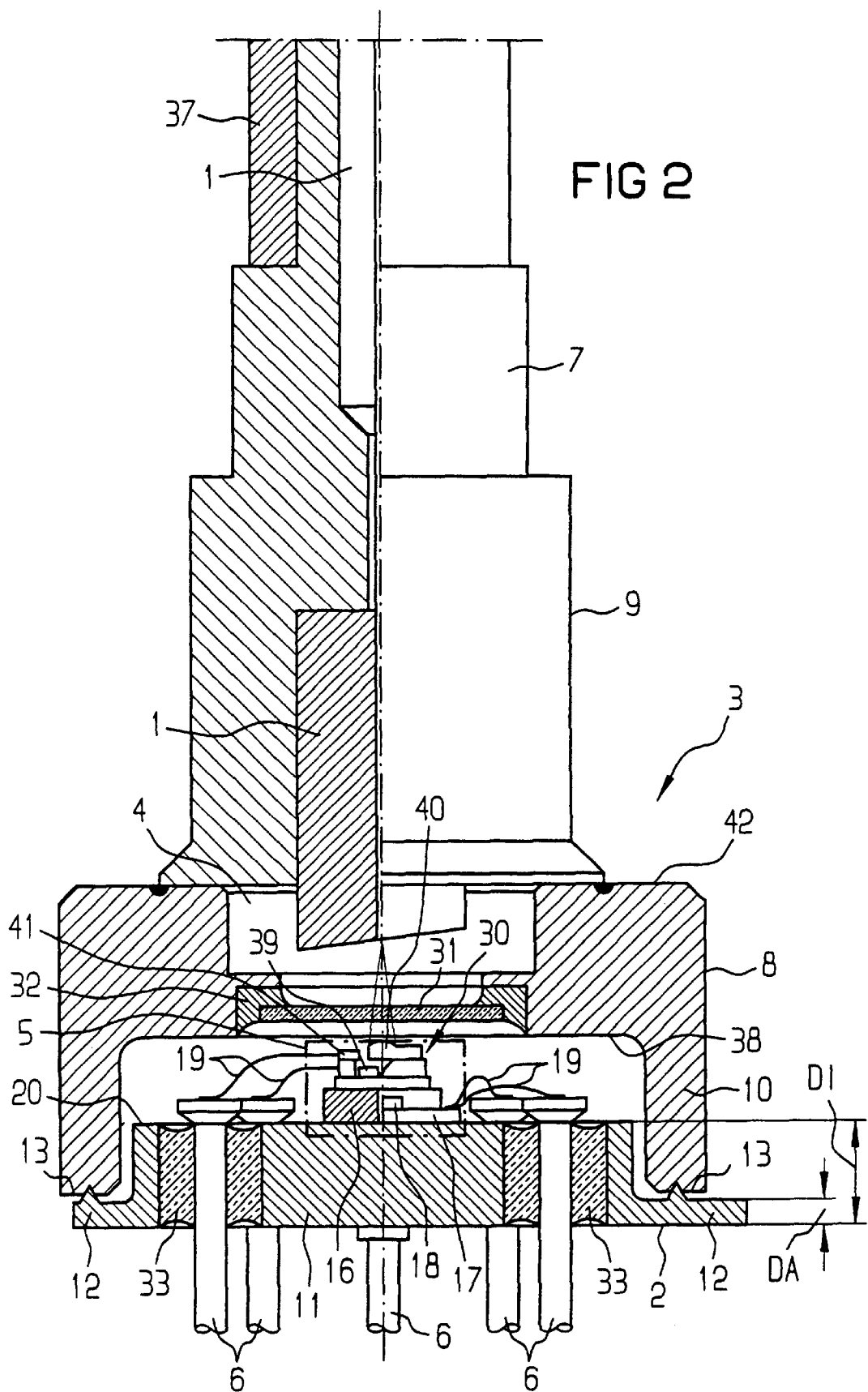
FIG. 2 is a sectional view of a further optoelectronic transmitting and/or receiving module.

The support plate 2 has an inner region 11, which at least partly has a greater thickness DI than a thickness DA of a covering cap mounting region 12 enclosing the inner region 11. The mounting region 12 has a mounting area 42. The covering cap 3 has a side wall 10 and an optical window 4 and is fixed on the support plate 2. The covering cap 3 is configured in such a way that an end area 13 of the side wall 10 is seated on the covering cap mounting region 12 of the support plate 2. A mechanically fixed and hermetically sealed joint 28 between the support plate 2 and the covering cap 3 is realized e.g. through the use of resistance welding, laser welding or a conventional weld seam, but could also be soldered or adhesively bonded. A transparent disk 31 is disposed in the optical window 4 of the covering cap 3. The disk is connected to the covering cap 3 through the use of a bonding agent 32 and, if necessary, hermetically sealing off the covering cap. By way of example, an adhesive or a glass solder can be used as the bonding agent 32. The covering cap 3 has an optical waveguide connection device 7 on that side of the window 4 which is opposite to the support plate 2. An optical waveguide 1 is fixed in the optical waveguide connection device 7 and e.g. a fiber-optic cable 37 seen in FIG. 2 is coupled to the optical waveguide connection device 7. By way of example, the optical waveguide connection device 7 may have a fiber-optic pigtail guide constructed as a pigtail.

The covering cap 3 is positioned and fixed on the support plate 2 in such a way that radiation emitted and/or received by the optoelectronic transmitting and/or receiving unit 5 is coupled optimally into the optical waveguide 1 and/or into the optoelectronic transmitting and/or receiving unit 5.

In order to make it possible to adjust the optical waveguide 1 with respect to the optoelectronic transmitting and/or receiving unit 5 parallel to an upper surface 20 of the support plate 2, an area enclosed by the side wall 10 of the covering cap 3 is larger in all of its dimensions than the area of the inner region 11. This is done in such a way that the covering cap 3 placed onto the covering cap mounting region 12 of the support plate 2 can be displaced parallel to the upper surface 20 of the support plate 2 in all directions. The optical waveguide 1 can thus be brought to the desired position in a simple manner by displacing the covering cap 3 before it is finally fixed on the support plate 2. It is likewise possible for a distance between the optical waveguide 1 and the optoelectronic transmitting and/or receiving unit 5 to be set in a simple manner before the covering cap 3 is finally fixed on the support plate 2. It is only then that the joint 28 is produced through the use of laser welding, for example.

In the course of producing the optoelectronic transmitting and/or receiving module, first of all the hybrid laser module chip 30 with the optical converging configuration 40 is produced, and the optical converging configuration is adjusted with respect to the laser diode chip 39. Afterwards, the hybrid laser module chip 30 is fixed on the heat sink 16 which is already situated on the support plate 2 or is subsequently mounted thereon. Afterwards, the covering cap 3 is placed onto the support plate 2, adjusted and connected, e.g. welded, to the plate.

In the case of the optoelectronic transmitting and/or receiving module illustrated in FIG. 2, the covering cap 3 is composed of a first part 8 and a second part 9. The first part 8 is constructed as a housing cap (covering cap) with the radiation passage opening 4, the transparent disk 31 disposed in the opening and a side wall 10. The side wall 10 and the support plate 2 enclose the optoelectronic transmitting and/or receiving unit 5. The second part 9 (connection part) has the optical waveguide connection device 7 and is fixed on the mounting area 42 of the first part 8, in such a way that the optical waveguide 1 disposed in the optical waveguide connection device 7 is disposed above the radiation passage opening 4, as seen from the support plate 2. The second part 9 is fixed on the first part 8, for example, through the use of resistance welding, laser welding, soldering or adhesive bonding. Moreover, there is no further essential difference from the exemplary embodiment of FIG. 1 with respect to the structure. If the joint between the first part 8 and the second part 9 is hermetically sealed or if a hermetically sealed housing is not necessary for the optoelectronic transmitting and/or receiving unit 5, then the disk 31 can be omitted.

In a method for producing an optoelectronic transmitting and/or receiving module in accordance with the example of FIG. 2, the production and fixing of the transmitting and/or receiving unit 5 on the support plate 2 initially takes place. Then the first part 8 (housing cap) is fixed on the support plate 2. Next the second part 9 (connection part) with the optical waveguide connection device 7 is adjusted by displacing the second part 9 with respect to the support plate 2, e.g. for maximum radiation input coupling into the optical waveguide 1 and/or into the receiving element 18, and is fixed on the housing cap 8.

Figure 3:
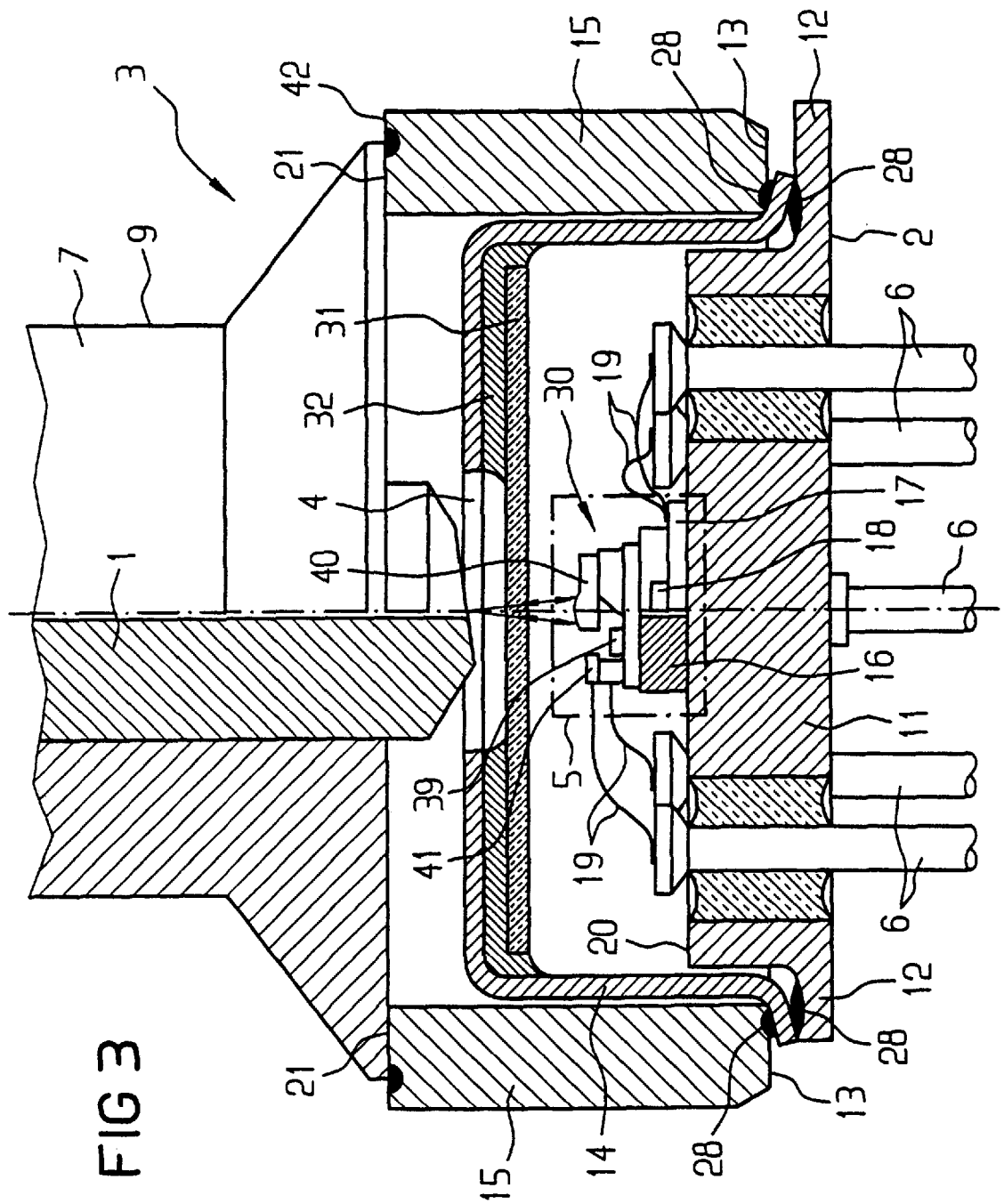
FIG. 3 is a fragmentary, sectional view of an exemplary embodiment of an optoelectronic transmitting and/or receiving module according to the invention.

FIG. 3 illustrates an exemplary embodiment of the optoelectronic transmitting and/or receiving module according to the invention. In this exemplary embodiment, the covering cap 3 is composed of three parts, namely a window cap 14, a wall sleeve 15 enclosing the window cap 14, and the connection part 9 with the optical waveguide connection device 7. The connection part 9 is fixed on the wall sleeve 15. The window cap 14 is provided with the window 4, which is hermetically sealed off through the use of the transparent disk 31 in conjunction with a bonding agent 32. The window cap 14 and the support plate 2 together form a hermetically sealed housing for the optoelectronic transmitting and/or receiving unit 5. For this purpose, the window cap 14 is fixed on the support plate 2 through the use of welding, adhesive bonding or soldering. The wall sleeve 15, which has the end area 13 facing the support plate 2, is connected to the window cap 14 through the use of welding, adhesive bonding or soldering. The wall sleeve 15 also serves as a supporting apparatus for the connection part 9 with the optical waveguide connection device 7. The wall sleeve 15 has an end area 21 remote from the support plate 2, which represents the mounting area 42 in this case. The optical waveguide connection device 7 is likewise fixed on the end area 21 through the use of welding, soldering or adhesive bonding.

It is also conceivable for the connection part 9 with the optical waveguide connection device 7 and the wall sleeve 15 of the exemplary embodiment of FIG. 3 to be constructed in one piece. In order to then make it possible to adjust the optical waveguide with respect to the optoelectronic transmitting and/or receiving unit 5, the area enclosed by the wall sleeve 15 must be greater than the outer diameter of the window cap 14, in such a way that the wall sleeve 15 can be displaced parallel to the upper surface 20 of the support plate 2 in all directions. More specifically, in that case, the wall sleeve 15 together with the optical waveguide connection device 7 can be adjusted exactly with respect to the optoelectronic transmitting and/or receiving unit 5 before the final fixing on the window cap 14 or on the support plate 2.

It is likewise conceivable, in the exemplary embodiment of FIG. 3, for the window cap 14 to be omitted and for the wall sleeve 15 to be emplaced on the support plate 2, with the connection part 9 having the optical waveguide connection device 7 being fixed on the wall sleeve.

In a preferred method for producing an optoelectronic transmitting and/or receiving module in accordance with the exemplary embodiment of FIG. 3, initially the production and fixing of the transmitting and/or receiving unit 5 on the support plate 2 takes place. Then the window cap 14 is fixed on the support plate 2, in such a way that the support plate 2, together with the window cap 14, forms e.g. a hermetically sealed housing. Afterwards, the wall sleeve 15 is placed onto the window cap 14 or the support plate 2 and fixed before the connection part 9 with the optical waveguide connection device 7 is adjusted by the connection part 9 being displaced with respect to the support plate 2, e.g. for maximum radiation input coupling into the optical waveguide 1 and/or into the receiving element 18, and is fixed on the wall sleeve 15. If the wall sleeve 15 is constructed in one piece with the connection part 9, then it is adjusted by displacing the wall sleeve 15 with respect to the window cap 14. The wall sleeve 15 must then be configured analogously to the embodiment with a one-part covering cap with an optical waveguide connection device in such a way that it can be displaced with respect to the support plate 2 before being fixed thereon.

Figure 4:
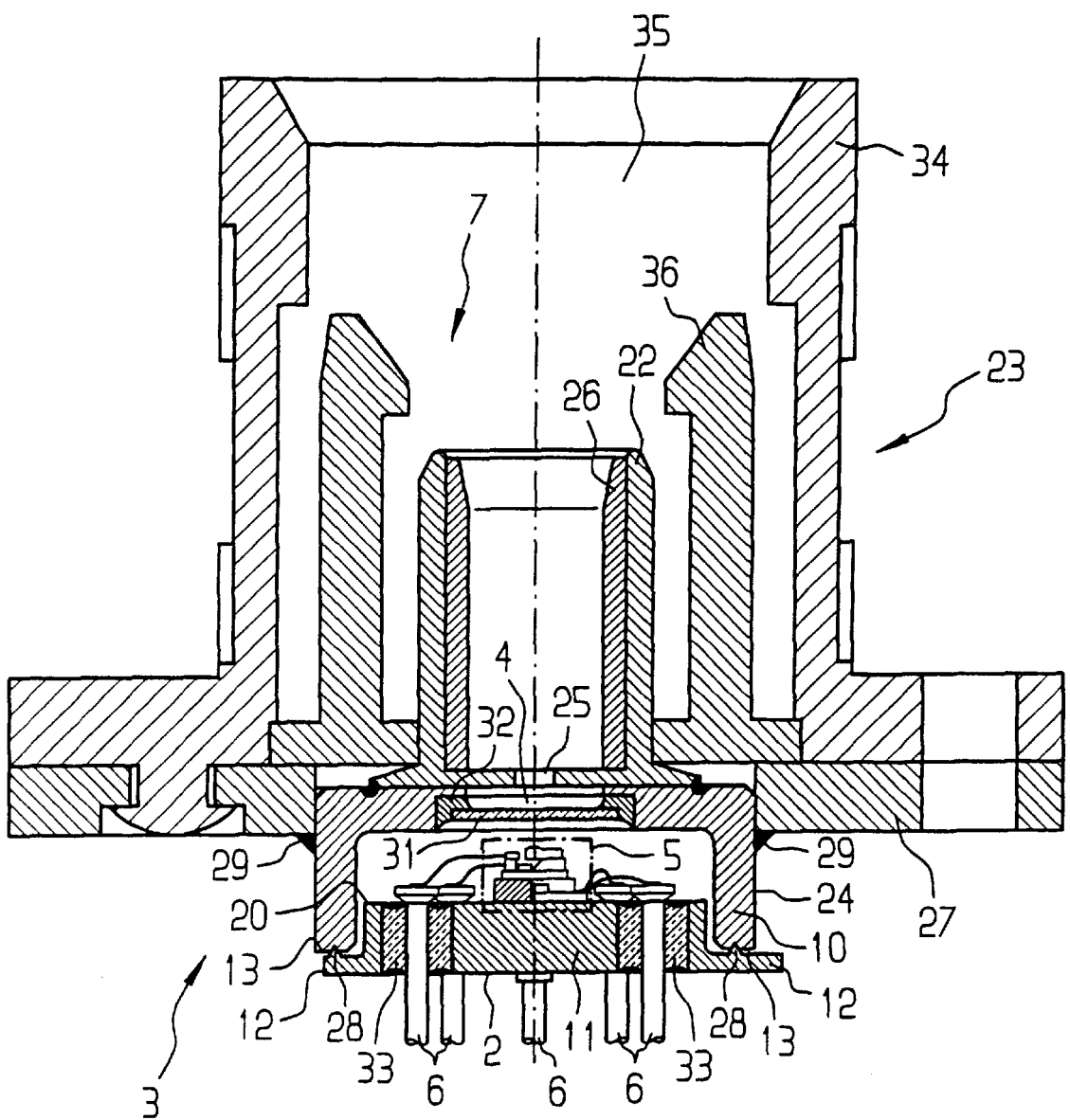
FIG. 4 is a sectional view of a further exemplary embodiment of the optoelectronic transmitting and/or receiving module according to the invention.

FIG. 4 shows an exemplary embodiment of the optoelectronic transmitting and/or receiving module according to the invention. This exemplary embodiment differs from the examples described above in particular by virtue of the fact that the covering cap 3 has a guiding sleeve 22 (a so-called receptacle coupling sleeve) for a ferrule of an optical waveguide, and a receptacle 23 (a so-called receptacle body). By way of example, the guiding sleeve 22 is fixed on a housing part 24 corresponding to the first part 8 in the example of FIG. 2. As a result, a guiding sleeve window 25 formed in the guiding sleeve 22 is disposed above the window 4 in the housing part 24. An inner surface of the guiding sleeve 22 is provided with a ceramic sleeve 26, for example, for precise guidance of an optical waveguide that can be inserted.

The receptacle 23 has a receptacle baseplate 27 fixed on the housing part 24, with a hole into which the housing part 24 is inserted. A joint 29 between the receptacle baseplate 27 and the housing part 24 is produced, for example, through the use of adhesive bonding, soldering or welding. A receptacle sleeve 34 composed of plastic or metal, for example, is fixed on the receptacle baseplate 27 and is constructed in such a way that the guiding sleeve 22 is situated in its entirety in a socket interior 35. The socket interior 35 is defined by a composite formed by the receptacle baseplate 27, the receptacle sleeve 34 and the housing part 24. Furthermore, a retaining clip 36 is fixed in the socket interior 35 and serves to fix a correspondingly constructed optical waveguide connector in the receptacle 23.

The receptacle sleeve 34 including the retaining clip 36 can be configured optionally in accordance with the standardized connector housing types (STC, SC, FC, DIN, E2000, etc.). The housing type shown by way of example in FIG. 4 is a so-called SC receptacle.

It goes without saying that in the exemplary embodiment of FIG. 4, the covering cap 3 is not restricted exclusively to the embodiment illustrated therein. The housing part 24 including the guiding sleeve 22 can be constructed in one piece, for example. Compare in this respect the exemplary embodiment of FIG. 1, in which the covering cap 3 is constructed in one piece with the optical waveguide connection device 7.

Likewise, as in the exemplary embodiment of FIG. 3, the covering cap 3 can have a window cap 14 which is enclosed by a wall 15 and above which the guiding sleeve 22 is fixed.

For the sake of completeness, it will be mentioned, in conclusion, that the support plate 2 and the covering cap 3 in the examples of FIGS. 1 to 3 can be produced in their entirety from a metallic material or from another material which a person skilled in the art knows to be suitable. In the exemplary embodiment of FIG. 4, the baseplate 2, the housing part 24 including the guiding sleeve 22 and the receptacle baseplate 27 can, by way of example, likewise be composed of a metallic material. The receptacle sleeve 34 and the retaining clip 36 are produced from plastic, for example.

It holds true for all of the examples that if there is a hermetically sealed construction of the covering cap 3 with the optical waveguide connection device 7, there is no need for a transparent disk 31 in or before the window 4 and/or it is not necessary for the window 4 to be hermetically sealed off. In addition, the disk 31 can be constructed, for particular applications, as an optical filter for specific wavelengths or for specific intensities.

We claim:

1. An optoelectronic transmitting and receiving module for signal transmission with an optical waveguide, comprising:

a housing formed substantially of a support plate and a covering cap, said support plate having a hermetically sealed window cap with a radiation passage opening;

an optoelectronic transmitting and receiving unit disposed in said housing and associated with said support plate, said optoelectronic transmitting and receiving unit having an optoelectronic transmitting element, an optoelectronic receiving element and an optical radiation focusing device adjusted relative to said optoelectronic transmitting and receiving elements;

an electrically conductive bushing passing through said housing for at least one electrical connection of said optoelectronic transmitting and receiving unit; and a transparent disk disposed in said radiation passage opening, said disk constructed as an optical filter for attenuating specific wavelengths or intensities or allowing them to pass, depending on requirements;

said covering cap having a wall sleeve and a connection part with an optical waveguide connection device, said connection part displaceable on said wall sleeve for adjusting said optical waveguide connection device relative to said optoelectronic transmitting and receiving unit substantially immediately before finally fixing said connection part on said wall sleeve for connecting said optical waveguide connection device to said wall sleeve; and said window cap enclosed by said wall sleeve and disposed below said optical waveguide connection device.

2. The optoelectronic transmitting and receiving module according to claim 1, wherein said connection part and said wall sleeve are connected to one another in a non-releasable manner by adhesive bonding.

3. The optoelectronic transmitting and receiving module according to claim 1, wherein said connection part and said wall sleeve are connected to one another in a non-releasable manner by soldering.

4. The optoelectronic transmitting and receiving module according to claim 1, wherein said connection part and said wall sleeve are connected to one another in a non-releasable manner by welding.

5. The optoelectronic transmitting and receiving module according to claim 1, wherein said optical waveguide connection device has a receptacle for an optical waveguide connector.

6. The optoelectronic transmitting and receiving module according to claim 1, wherein said support plate has a covering cap mounting region with a given thickness and an inner region with a thickness greater than said given thickness.

7. A method for producing an optoelectronic transmitting and receiving module for signal transmission with an optical waveguide, which comprises:

a) producing an optoelectronic transmitting and receiving unit with an optoelectronic transmitting element, an optoelectronic receiving element and an optical radiation focusing device adjusted relative to at least one of the elements;

b) fixing the optoelectronic transmitting and receiving unit on a support plate;

c) fixing a window cap with a radiation passage opening and with an optical filter disposed in the radiation passage opening, on the support plate;

d) fixing a wall sleeve enclosing and projecting above the window cap, on one of the support plate and the window cap;

e) placing a connection part with an optical waveguide connection device on the wall sleeve above the radiation passage opening of the window cap;

f) starting up the optoelectronic transmitting and receiving unit;

g) adjusting the connection part with the optical waveguide connection device relative to the optoelectronic transmitting and receiving unit by displacing the connection part and the support plate relative to one another; and h) fixing the connection part relative to the support plate.

* * * * *